United States Patent [19]

Smith

[11] 3,896,073
[45] July 22, 1975

[54] AQUEOUS DISPERSIONS OF FILM-FORMING

[75] Inventor: Thomas Woods Smith, Ann Arbor, Mich.

[73] Assignee: The Lubrizol Corporation, Cleveland, Ohio

[22] Filed: Nov. 28, 1972

[21] Appl. No.: 310,067

Related U.S. Application Data

[63] Continuation-in-part of Ser. No. 62,677, Aug. 10, 1970, abandoned.

[52] U.S. Cl. .......... 260/29.6 RW; 260/29.4 UA; 260/29.6 H; 260/39P; 260/875; 260/885 260/39 P; 260/875; 260/885
[51] Int. Cl. ............................................. C08f 45/24
[58] Field of Search ..... 260/29.4 R, 29.4 UA, 72 R, 260/29.6 H, 63, 65, 66, 39 P, 29.6 RW, 875, 885

[56] References Cited
UNITED STATES PATENTS 3,277,056   10/1966   Coleman ............................ 260/63
3,425,942   2/1969    Coleman ............................ 252/51.5
3,497,467   2/1970    Coleman ........................ 260/29.6 H
3,518,326   6/1970    Forsberg ............................ 260/828
3,585,125   6/1971    Hoke .................................. 210/23
3,637,615   1/1972    Coffman .............................. 260/66
3,701,754   10/1972   Farone .............................. 260/72 R Primary Examiner—Lorenzo B. Hayes
Attorney, Agent, or Firm—James W. Adams, Jr.; William H. Pittman

[57] ABSTRACT

Aqueous dispersions of film-forming polymers having improved wet adhesion and blister resistance capabilities are produced by grafting certain substituted acrylamides, such as diacetone acrylamide and hydroxymethylated derivatives thereof, on polyvinyl acetate and similar latices. The aqueous dispersions are useful as paints, adhesives, and the like.

11 Claims, No Drawings

AQUEOUS DISPERSIONS OF FILM-FORMING

This application is a continuation-in-part of copending application Ser. No. 62,677, filed Aug. 10, 1970, now abandoned.

This invention relates to new compositions of matter and to processes for their preparation. More particularly, it relates to compositions which are fluid at room temperature and which comprise substantially stable dispersions in water of at least one film-forming polymer wherein at least a portion of the polymer molecules have grafted thereon one or more units derived from at least one (A) polymerizable substituted acrylamide of the formula (I) 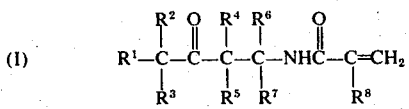

wherein each of $R^1$, $R^2$, $R^3$, $R^4$, $R^5$, $R^6$ and $R^7$ is hydrogen or a lower alkyl or substituted lower alkyl radical, at least one of $R^1$, $R^2$, $R^3$, $R^4$ and $R^5$ being hydrogen, and $R^8$ is hydrogen, halogen or a lower alkyl or substituted lower alkyl radical; or (B) water-soluble hydroxyalkylated composition derived from said substituted acrylamide.

As is well known, large quantities of filmforming polymeric materials are presently employed commercially in the form of substantially stable aqueous dispersions to produce protective films on various surfaces such as wood, metal, and concrete surfaces, and as adhesives for joining or fastening wood to wood, wood to paper, paper to paper, wood to cloth, cloth to cloth, cloth to paper and the like. Such dispersions in the form of latex paints are used extensively in painting both exterior and interior surfaces. Also, the furniture industry employs a large quantity of such dispersions as adhesives.

However, two problems often encountered in using these dispersions are their inability to adhere to various surfaces under conditions of high humidity and moisture and the tendency of the films to develop blisters when subjected to such conditions. Obviously, an increase in the wet adhesion capabilities and/or a decrease in the tendency to form blisters would improve the performance of these dispersions when employed as adhesives or to form protective films.

It has now been determined that the wet adhesion capabilities and blister resistance of films and adhesives prepared from these dispersions can be increased if at least a portion of the polymer molecules contain grafts derived from certain N-substituted acrylamides which are described hereinafter.

In accordance with the foregoing, a principal object of this invention is to provide novel compositions of matter.

A further object is to provide substantially stable aqueous dispersions of film-forming polymers.

A further object is to provide such dispersions wherein a portion of the polymer molecules are characterized by grafts derived from certain substituted acrylamides.

Another object is to provide stable aqueous dispersions of film-forming polymers capable of producing films characterized by improved wet adhesion and blister resistance.

Still another object is to provide mixtures of certain substituted acrylamide monomers with substantially stable aqueous dispersions of film-forming polymers.

Another object is to provide a process comprising the polymerization of certain substituted acrylamides in situ in substantially stable aqueous dispersions of film-forming polymers.

Other objects of this invention will be apparent to those skilled in the art from the following detailed description of the invention and the appended claims.

The polymers in the dispersions of this invention are predominantly graft polymers. As used herein, the term "graft polymer" or "graft copolymer" denotes polymers having a backbone of one polymeric species which has pendant therefrom one or more side chains (or grafts) derived from an ethylenically unsaturated monomer, the graft polymer generally being formed by polymerization of the monomer in the presence of the polymer forming the backbone as described hereinafter. The backbone polymer is herein referred to as the "base polymer" and may be derived from a homopolymer, copolymer, terpolymer or other interpolymer. The side chains or grafts are derived at least in part from the substituted acrylamides described hereinafter and may be homopolymeric chains or copolymeric chains derived from two or more of said substituted acrylamides or from combinations of said substituted acrylamides with other comonomers polymerizable therewith. The monomers used to form the side chains or grafts are referred to herein as "grafting monomers", and those derived from the aforementioned substituted acrylamides are sometimes referred to as "acrylamide grafting monomers". In general, the amount of acrylamide grafting monomer employed in the grafting process contemplated by this invention is at least about 0.25 percent, preferably at least 1 percent, by weight of the base polymer.

The base polymers useful in the preparation of the compositions of this invention may be any of the film-forming polymers and interpolymers capable of existing as dispersed, suspended solids in substantially stable aqueous dispersions. They are usually those which have achieved commercial acceptance as paints and adhesives. These include isoprene latices (both natural and synthetic), isobutylene-isoprene copolymer latices containing about 3–10 percent by weight of units derived from isoprene, vinylidene chloride-acrylonitrile copolymers containing about 5–15 percent of units derived from acrylonitrile, polyvinyl acetate polymer latices wherein vinyl acetate units comprise at least about 50 percent of the polymer, chloroprene-acrylonitrile latices wherein up to about 15 percent of the polymer units are acrylonitrile units, neoprene latices, butadiene-acrylonitrile copolymer latices containing about 30–45 percent of units derived from acrylonitrile, styrene-butadiene-acrylic acid terpolymer latices containing about 30–60 percent styrene units and about 1–10 percent acrylic acid units, styrene-butadiene-vinylpyridine terpolymer latices containing about 15–35 percent styrene and about 5–15 percent vinylpyridine units, and various polymer latices containing units derived from alkyl methacrylates and alkyl acrylates.

However, the preferred base polymers are the latices of vinyl acetate, alkyl acrylate and alkyl methacrylate polymers. Again, it is useful to utilize commercially available polymer latices containing these preferred base polymers but substantially stable aqueous dispersions of these polymers as well as the others suggested hereinbefore can be easily prepared by emulsion polymerization techniques.

In these preferred base polymers, at least about 50 percent by weight of the average molecular weight of the polymer is derived from vinyl acetate, alkyl acrylate or alkyl methacrylate units. The alkyl moiety of the alkyl acrylates and alkyl methacrylates will normally not contain more than twelve carbon atoms.

Thus, both homopolymers and interpolymers of vinyl acetate, alkyl acrylates and alkyl methacrylates are contemplated. Accordingly, the copolymers and terpolymers of these monomers with other monomers from the same or different classes may be used as the film-forming base polymer. These classes of monomers are: (1) esters of unsaturated alcohols, (2) esters of unsaturated acids, (3) esters of unsaturated polyhydric alcohols (e.g., butenediols), (4) vinyl cyclic compounds, (5) unsaturated ethers, (6) unsaturated ketones, (7) unsaturated amides, (8) unsaturated aliphatic hydrocarbons, (9) vinyl halides, (10) unsaturated acids, (11) unsaturated acid anhydrides, (12) unsaturated acid chlorides, and (13) unsaturated nitriles. These classes of polymerizable, ethylenically unsaturated classes of monomers are illustrated below. It should be pointed out also that polymers useful as base polymers and not falling within this preferred class will be, in general, derived from monomers falling within these thirteen classes. Such polymers are well known as are the emulsion polymerization techniques for preparing them as substantially stable aqueous dispersions.

(1) Esters of unsaturated alcohols such as allyl, methallyl, crotyl, 1-chloroallyl, 2-chloroallyl, cinnamyl, vinyl, methylvinyl, 1-phenallyl and butenyl alcohols with (a) saturated acids such as acetic, propionic, butyric, valeric, caproic and stearic acids, (b) unsaturated acids such as acrylic and alpha-substituted acrylic acids (including alkylacrylic acids, e.g., methacrylic, ethylacrylic, propylacrylic acids, etc., and arylacrylic acids such as phenylacrylic acid), crotonic, oleic, linoleic and linolenic acids; (c) polybasic acids such as oxalic, malonic, succinic, glutaric, adipic, pimelic, suberic, azelaic and sebacic acids; (d) unsaturated polybasic acids such as maleic, fumaric, citraconic, mesaconic, itaconic, methylenemalonic, acetylenedicarboxylic and aconitic acids; or (e) aromatic acids, e.g., benzoic, phenylacetic, phthalic, terephthalic and benzoylphthalic acids.

(2) Esters of saturated alcohols, such as esters of methyl, ethyl, propyl, isopropyl, butyl, isobutyl, secbutyl, tert-butyl, 2-ethylhexyl, cyclohexyl or behenyl alcohols, with unsaturated aliphatic monobasic and polybasic acids, examples of which are illustrated in (1) above.

(3) Esters of unsaturated polyhydric alcohols, e.g., butenediol, with saturated and unsaturated aliphatic and aromatic, monobasic and polybasic acids, illustrative examples of which appear in (1) above.

(4) Vinyl cyclic compounds including (a) monovinyl aromatic hydrocarbons, e.g., allylbenzene, styrene, o-, m-, p-chlorostyrenes, bromostyrenes, fluorostyrenes, methylstyrenes, ethylstyrenes and cyanostyrenes; di-, tri-, and tetra-, etc., chlorostyrenes, bromostyrenes, iodostyrenes, fluorostyrenes, methylstyrenes, ethylstyrenes and cyanostyrenes; vinylnaphthalenes, vinylcyclohexanes; (b) corresponding polyvinyl compounds such as divinylbenzene and trivinylbenzene; and (c) vinyl heterocycles such as vinylfuran, vinylpyridine, vinylbenzofuran, N-vinylcarbazole, N-vinylpyrrolidone and N-vinyloxazolidone.

(5) Unsaturated ethers such as methyl vinyl ether, ethyl vinyl ether, cyclohexyl vinyl ether, octyl vinyl ether, diallyl ether, ethyl methallyl ether and allyl ethyl ether.

(6) Unsaturated ketones such as methyl vinyl ketone and ethyl vinyl ketone.

(7) Unsaturated amides, such as acrylamide, methacrylamide, N-methylacrylamide, N-phenylacrylamide, N-allylacrylamide, N-methylolacrylamide and N-allylcaprolactam.

(8) Unsaturated aliphatic hydrocarbons, for instance, ethylene, propylene, butenes, butadiene, piperylene, isoprene, methylisoprene, 2-chloro-1,3-butadiene, and other alpha-olefins and conjugated dienes of up to twenty carbon atoms.

(9) Vinyl halides, e.g., vinyl fluoride, vinyl chloride, vinyl bromide, vinylidene chloride, vinylidene bromide, allyl chloride and allyl bromide.

(10) Unsaturated mono- and polybasic acids such as exemplified in (1) above.

(11) Unsaturated acid anhydrides, e.g., maleic, citraconic, itaconic, cis-4-cyclohexene-1,2-dicarboxylic and bicyclo(2.2.1)-5-heptene-2,3-dicarboxylic anhydrides.

(12) Unsaturated acid halides such as cinnamoyl, acrylyl, methacrylyl, crotonyl, oleyl and fumaryl chlorides or bromides.

(13) Unsaturated nitriles, e.g., acrylonitrile, methacrylonitrile and other substituted acrylonitriles.

It is to be understood that interpolymer latices of one or more of the foregoing classes of monomers with one or more of the substances used as acrylamide grafting monomers can also be used as base polymers to form compositions of the present invention.

The base polymers can have average molecular weights of about 5000–1,500,000. However, the average molecular weights ordinarily will be about 10,000–1,000,000 and most desirably about 15,000–750,000.

The acrylamide grafting monomers useful in the compositions of this invention fall into two major classes. The first of these comprises N-3-oxohydrocarbon-substituted acrylamides having formula I hereinabove. In that formula, each of the $R^{1-7}$ radicals is hydrogen or a lower alkyl or substituted lower alkyl radical. By "lower alkyl" is meant alkyl radicals containing up to 7 carbon atoms. By "substituted" is meant radicals containing substituents which do not alter significantly the character or reactivity of the radical. Examples are:

Halide (fluoride, chloride, bromide, iodide)
Ether (especially lower alkoxy)
Keto
Carboxy
Ester (especially lower carbalkoxy)
Aminoacyl (amide)
Nitro
Cyano
Thioether
Sulfoxy
Sulfone In general, no more than about two such substituent groups will be present in each radical.

As indicated, $R^8$ is hydrogen, halogen or a lower alkyl or substituted lower alkyl radical; it is usually hydrogen or methyl, and preferably hydrogen.

Suitable N-3-oxohydrocarbon-substituted acrylamides are disclosed in U.S. Pat. Nos. 3,277,056 and 3,686,306; both of these patents are incorporated by reference herein. The preferred N-3-oxohydrocarbon-substituted acrylamide is diacetone acrylamide, to which reference will frequently be made hereinafter; however, it is to be understood that the other N-3-oxohydrocarbon-substituted acrylamides represented by formula I may be substituted therefor.

The second, and preferred, class of compositions useful as acrylamide grafting monomers is referred to herein as "water-soluble hydroxyalkylated compositions" and consists of derivatives of the above-described N-3-oxohydrocarbon-substituted acrylamides containing one or more hydroxyalkyl groups together with condensed radicals derived from said hydroxyalkyl groups, as more fully described hereinafter. These water-soluble hydroxyalkylated compositions are disclosed and claimed in copending application Ser. No. 111,676, filed Feb. 1, 1971. They are generally prepared by reacting, in the presence of an alkaline reagent, an aliphatic aldehyde containing not more than 4 carbon atoms, or a reversible polymer thereof, with said N-3-oxohydrocarbon-substituted acrylamide and especially with diacetone acrylamide, said reaction being effected in a diluent comprising (1) water, or (2) an organic liquid which is a solvent for the reactants or the product or both, or (3) a mixture of diluents 1 and 2.

Aldehydes which may be reacted with diacetone acrylamide to form the water-soluble hydroxyalkylated compositions include formaldehyde, acetaldehyde, propionaldehyde and the butyraldehydes. Of these, formaldehyde is preferred. Reversible polymers of the aldehydes (e.g., paraformaldehyde, trioxane, paraldehyde) may be used in place of the monomeric aldehydes and are considered equivalents thereof.

Alkaline reagents suitable for use include sodium hydroxide, potassium hydroxide, alkaline earth metal hydroxides, sodium methoxide, quaternary ammonium hydroxides and the like. The proportion of alkaline reagent should, in general, not exceed about 5 mole percent of the aldehyde used and usually need not be greater than about 1.5 mole percent thereof. While larger amounts may sometimes be employed, the use of such larger amounts is unnecessary and requires very close control of the reaction (e.g., through use of an alcohol solvent or cautious incremental addition of the alkaline reagent, as described hereinafter) to avoid formation of a water-insoluble polymeric product as discussed hereinafter.

The reaction temperature is not critical, so long as it is not high enough to cause decomposition of the reactants or product or condensation to a water-insoluble product. Temperatures below about 100°C., preferably about 40°–90°C., are preferred. Likewise, the molar ratio of aldehyde to diacetone acrylamide is not critical. This ratio is usually between about 1:1 and 8:1, preferably between 1:1 and 4:1. In some instances the presence of a polymerization inhibitor such as hydroquinone, hydroquinone monomethyl ether or a hindered phenol may be beneficial.

As previously mentioned, the reaction is carried out in a diluent comprising (1) water, or (2) an organic liquid which is a solvent for the reactants or the product or both, or (3) a mixture of diluents 1 and 2. Suitable organic diluents include alcohols, especially lower alkanols such as methanol, ethanol, n-butanol, isobutanol and the like; ethers and ether alcohols such as di-n-butyl ether, ethylene glycol monomethyl ether, ethylene glycol dimethyl ether, diethylene glycol monomethyl ether, dioxane and the like; and aromatic hydrocarbons such as benzene, toluene and xylene. The lower alkanols are particularly preferred by reason of the fact that they serve as solvents for both the reactants and the products. The same is true of water, and in the particularly preferred method for producing the water-soluble hydroxyalkylated composition, water alone is the diluent.

The water-soluble hydroxyalkylated compositions are not simple chemical compounds, and they can be completely defined only in terms of the method for their preparation. However, a fair amount of information about the structure of these compositions has been obtained by various analytical procedures including elemental analysis, infrared and nuclear magnetic resonance spectroscopy, and gel permeation chromatography. These procedures, when applied to the water-soluble condensation product of diacetone acrylamide with formaldehyde or paraformaldehyde, show that the principal constituents thereof are: (1) first, hydroxyalkyl compounds of the formula (II) 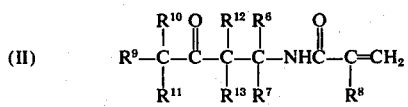

wherein each of $R^9$, $R^{10}$, $R^{11}$, $R^{12}$ and $R^{13}$ is hydrogen, a lower alkyl or substituted lower alkyl radical, or a hydroxyalkyl radical having not more than 4 carbon atoms, at least one and preferably from one to four of said radicals being hydroxyalkyl radicals and the remainder thereof preferably being hydrogen, and $R^6$, $R^7$ and $R^8$ are as previously defined, these hydroxyalkyl compounds being the predominant chemical species; and second, when an alcohol is used as a diluent, analogous compounds containing alkoxyalkyl (preferably lower alkoxyalkyl) radicals in place of one or more (usually one or two) of said hydroxyalkyl radicals; and (2) water-soluble condensation dimers and trimers of said compounds, which are apparently formed by condensation of the hydroxyalkyl and alkoxyalkyl compounds of formula II through ether or methylene linkages.

In general, the water-soluble hydroxyalkylated composition consists essentially of the above-described compounds; that is, said compounds are the only ones present which materially affect or contribute to the properties thereof. It may also sometimes contain small amounts of higher condensation oligomers.

It is usually found that the water-soluble hydroxyalkylated composition also contains measurable amounts of diacetone acrylamide (or other compounds of formula I used as reactants), since it is difficult to force the hydroxyalkylation reaction to completion. The diacetone acrylamide may be present in amounts up to about 50 percent by weight of the hydroxyalkylated composition, but it generally comprises less than about 20 percent by weight thereof. The presence of diacetone acrylamide is not detrimental, but at the same time it does not appear to be beneficial since diacetone acrylamide merely functions as a diluent. Therefore, the percentage thereof is preferably kept as low as possible.

Likewise, the presence of alkoxy derivatives and condensation dimers and trimers, especially the latter, is not harmful; in fact, such materials frequently improve the curing properties of the compositions of this invention. However, if the reaction between diacetone acrylamide and the aldehyde is allowed to proceed too fast (especially in the presence of relatively large amounts of alkaline reagent, as mentioned hereinabove), condensation of the hydroxyalkyl compounds may get out of control and the product may contain substantial or major proportions of a water-insoluble thermosetting resin of the type disclosed and claimed in U.S. Pat. No. 3,518,326 and U.S. Reissue Pat. No. 27,328.

There are a number of ways to control the reaction so as to avoid formation of the water-insoluble resin. One is through the use of an alcohol as solvent; apparently under such conditions the formation of alkoxyalkyl derivatives is favored and such derivatives undergo condensation less easily than the hydroxyalkyl compounds. A second is through incremental addition of the alkaline reagent over a prolonged period. When such incremental addition is employed, the pH of the mixture rises to about 10–11 after the addition of an increment of alkali but then gradually drops to about 7–8. It is believed that this is caused by a Cannizzaro-type reaction between excess alkali and excess formaldehyde to produce an alkali metal formate.

The method described above produces a solution or suspension of the water-soluble hydroxyalkylated composition in water or an organic diluent, usually a solution in water or an alcohol. It is possible to isolate the active material by removal of the diluent, which should be done cautiously and at relatively low temperatures (e.g., by vacuum evaporation or spray drying) to avoid condensation to a water-insoluble product as previously described. In the same way, the composition may be concentrated by removal of a portion of the diluent, or a higher-boiling diluent may be added and the lower-boiling one removed by evaporation. However, such procedures are usually unnecessary since the water-soluble hydroxyalkylated composition is conveniently used in the aqueous system in which it is prepared.

The preparation of water-soluble hydroxyalkylated compositions suitable for use as acrylamide grafting monomers according to this invention is illustrated by the following examples. All parts and percentages are by weight unless otherwise indicated.

EXAMPLE 1

A solution of 338 parts (2 moles) of diacetone acrylamide in 1000 parts of water is heated to 50°C. and 45 parts of a 3 percent aqueous solution of trisodium phosphate is added. Dropwise addition of a 37 percent aqueous solution of formaldehyde is then begun and is continued for one hour, a total of 650 grams (8 moles of formaldehyde) being added. During the formaldehyde addition, three further portions of trisodium phosphate solution, one of 14 parts and two of 15 parts, are added. Heating is continued for 5 hours after formaldehyde addition is complete, and during that time additional increments of trisodium phosphate solution are added, care being taken that the pH of the mixture never increases above 10, until a total of 299 parts have been introduced (0.16 mole, or 2.0 mole percent based on formaldehyde).

The solution is cooled and filtered, and volatile materials are removed by heating under vacuum at 55°C. The product is a 61 percent aqueous solution of the desired watersoluble composition.

EXAMPLE 2

Following the procedure of Example 1, a similar reaction product is prepared from diacetone acrylamide and acetaldehyde.

EXAMPLE 3

Following the procedure of Example 1, a similar reaction product is prepared from diacetone acrylamide and n-butyraldehyde.

EXAMPLE 4

A solution of 280 parts (1.66 moles) of diacetone acrylamide in 296 parts of distilled water is heated to 33°C., and 164 parts of paraformaldehyde (5 moles based on monomeric formaldehyde) is added over 20 minutes. The solution is then heated to 47°C. and 8.3 parts of a 10 percent aqueous solution of potassium hydroxide is added over 10 minutes. The reaction mixture is stirred and heated to 52°C. over about ½ hour, at which time an exothermic reaction begins; stirring is continued and the temperature is kept at about 50°C. by passing cooling water through a jacket on the reaction vessel. At the end of the 2-hour stirring period, an additional 8.3 parts of the potassium hydroxide solution is added, and a final 8.3 parts is added after a further two-hour stirring period (total 0.9 mole percent based on formaldehyde). The mixture is stirred for an additional 2 hours, cooled to 24°C. and filtered. The product, a 55 percent aqueous solution of the desired water-soluble composition, contains 3.04 percent nitrogen.

EXAMPLE 5

To a solution of 644 parts (3.81 moles) of diacetone acrylamide in 681 parts of water, at 31°C., is added, with stirring, 372 parts of paraformaldehyde (11.3 moles based on monomeric formaldehyde). The mixture is heated to 43°C. and 19 parts of a 10 percent aqueous solution of potassium hydroxide is added. The mixture is further heated, with stirring, to 48°–55°C. and maintained at this temperature for 2 hours. An additional 19 parts of potassium hydroxide solution is then added and stirring is continued for 2 hours, followed by addition of a third 19-ml. portion of potassium hydroxide solution (total 0.87 mole percent based on formaldehyde) and stirring for 2 more hours. The solution is then cooled to 29°C., 0.044 part of methylhydroquinone is added and the mixture is filtered. The product, a 53 percent aqueous solution of the desired water-soluble composition, contains 3.04 percent nitrogen.

EXAMPLE 6

A portion of the product of Example 5 (1500 parts) is heated at 50°–55°C./70 torr for 8½ hours, during which time 469 parts of water is removed by distillation. The product is an 80 percent aqueous solution of the desired water-soluble composition.

EXAMPLE 7

A mixture of 400 parts of the product of Example 5 and 220 parts of ethylene glycol monomethyl ether is heated at 58°–72°C./102 torr until 309 parts of volatile material has been removed by distillation. The residue is an approximately 71% solution of the desired water-soluble composition in ethylene glycol monomethyl ether.

EXAMPLE 8

A mixture of 1352 parts (8 moles) of diacetone acrylamide, 1136 parts of methanol and 480 parts of a solution comprising 55 percent formaldehyde (8.8 moles of formaldehyde), 35 percent methanol and 10 percent water is heated to 44°C., and 10 parts of a 10 percent solution of potassium hydroxide in methanol (0.2 mole percent of potassium hydroxide based on formaldehyde) is added. The mixture is heated at 44°–47°C. for 7 hours with stirring, and is then stripped of volatile materials by distillation at 48°C./4 torr. The watersoluble product contains 7.08 percent nitrogen.

EXAMPLE 9

Following the procedure of Example 8, a watersoluble product containing 6.16 percent nitrogen is obtained from 1014 parts (6 moles) of diacetone acrylamide, 1706 parts of methanol, 491 parts (9.0 moles of formaldehyde) of formaldehyde-methanol-water solution, and 10 parts of methanolic potassium hydroxide (0.2 mole percent potassium hydroxide based on formaldehyde).

EXAMPLE 10

Following the procedure of Example 8, a watersoluble product containing 6.38 percent nitrogen is obtained from 1014 parts (6 moles) of diacetone acrylamide, 1767 parts of methanol, 654 parts (12 moles of formaldehyde) of formaldehyde-methanol-water solution, and 10 parts of methanolic potassium hydroxide (0.15 mole percent potassium hydroxide based on formaldehyde).

EXAMPLE 11

A mixture of 1014 parts (6 moles) of diacetone acrylamide, 1890 parts of methanol, 981 parts (18 moles of formaldehyde) of the formaldehyde-methanol-water solution of Example 8 and 10 parts of a 10 percent solution of potassium hydroxide in methanol is heated to 50°C., with stirring, for about 3 hours. An additional portion of 10 parts of methanolic potassium hydroxide is added and heating and stirring are continued for 4 hours. A third portion of methanolic potassium hydroxide is then added (total 0.3 mole percent potassium hydroxide based on formaldehyde). Heating and stirring are continued for 4 hours, and then the solution is cooled and stripped of volatile materials by vacuum distillation as in Example 8. The water-soluble product contains 5.65 percent nitrogen.

EXAMPLE 12

A water-soluble product prepared by the method of Example 11 is freed of potassium ions by contact with a cation exchange resin. The resulting solution is stripped of volatile materials by vacuum distillation to obtain a 90 percent solution of the desired product.

EXAMPLE 13

Following the procedure of Example 11, a product is prepared from 2028 parts (12 moles) of diacetone acrylamide, 3482 parts of methanol, 1964 parts (36 moles of formaldehyde) of the formaldehyde-methanol-water solution, and 360 parts of methanolic potassium hydroxide. The product is neutralized with phosphoric acid to a pH of 6.45 and stripped of volatile materials under vacuum. The neutralized and stripped water-soluble product contains 5.03 percent nitrogen.

EXAMPLE 14

A mixture of 1268 parts (7.5 moles) of diacetone acrylamide, 1635 parts (30 moles of formaldehyde) of the formaldehyde-methanol-water solution of Example 8, and 15.8 parts of a 10 percent solution of potassium hydroxide in methanol (0.09 mole percent potassium hydroxide based on formaldehyde) is heated at 40°–50°C. for 5 hours, after which time volatile materials are removed by vacuum distillation. The water-soluble product contains 5.33 percent nitrogen.

EXAMPLE 15

Following the procedure of Example 4, a watersoluble product is prepared from a mixture having a 1:5 mole ratio of diacetone acrylamide to formaldehyde. The resulting product is stripped of volatile materials by distillation at 50°–55°C./60 torr to obtain a concentrated product containing only 20 percent water.

Normally, the compositions of this invention will be prepared by addition polymerization of the grafting monomer by free radical methods in the presence of the base polymer. Grafting by this method involves a transfer of a free radical site to the base polymer. Propagation with the grafting monomer from these transferred free radical sites produces the grafted side chains which are ultimately terminated by combination or disproportionation. As is well known, the transfer actually involves the creation of a new free radical site on the base polymer as a result of the abstraction of a chain-terminating group (e.g., a hydrogen or chlorine atom) therefrom.

Polymerization by the free-radical method may be achieved using bulk, solution, suspension or emulsion techniques by contacting the grafting monomer with a polymerization initiator in the presence of the base polymer at a temperature of about 0°–200°C., usually about 20°–125°C. Any conventional free radical initiators can be employed in preparing the graft polymers including x-ray and gamma irradiation. Suitable initiators include the organic peroxides such as benzoyl peroxide, cumyl hydroperoxide, tertiary butyl hydroperoxide, acetyl peroxide, and the like; hydrogen peroxide, hydrogen peroxide-ferrous ion combinations, azobisisobutyronitrile, sodium persulfate, ammonium persulfate, chlorosulfite, and the like. Benzoyl peroxide and tert-butyl hydroperoxide are particularly preferred initiators as are peroxide- and hydroperoxidebisulfite combinations in general. These bisulfites include the addition compounds of alkali bisulfites (especially sodium bisulfite) and an aldehyde or ketone and the hydrates of these addition products.

When free radical catalysts (e.g., benzoyl peroxide) are employed to initiate grafting, it is often helpful to premix the base polymer and catalyst, usually at the polymerization temperature, before adding the grafting monomers. This usually increases the efficiency of the grafting by reducing the amount of homopolymerization and copolymerization of the added monomers.

Solution polymerization may be effected in any substantially inert organic liquid diluent which is a solvent for the base polymer such as benzene, chlorobenzene, toluene, xylene, cyclohexane, n-hexane, naphtha, tetrahydrofuran, mineral oil, and the like. As a general rule, solution polymerization requires a high concentration of grafting monomer relative to the solvent to achieve the desired degree of grafting when compared with, for example, emulsion or bulk polymerization.

Emulsion polymerization is generally conducted in water or a mixture of water and a hydroxylated organic solvent. The latter are exemplified by alcohols and glycols, such as the lower alkanols (i.e., alkanols of up to seven carbon atoms), alkylene glycols (e.g., ethylene glycol, propylene glycol, tetramethylene glycol), polyalkylene glycols (e.g., diethylene glycol), mon-(lower alkyl) ethers of such glycols (e.g., ethylene glycol monobutyl ether, diethylene glycol monoethyl ether), and the like. Suitable emulsifiers for use in the preparation of emulsion polymers of this invention include cationic materials, e.g., stearyl dimethyl benzyl ammonium chloride; non-ionic materials, e.g., alkylaryl polyether alcohols and sorbitan mono-oleate; anionic materials, e.g., sodium decylbenzene sulfonate, dioctyl sodium sulfosuccinate, sodium salts of alkylaryl polyether sulfates, and sodium lauryl sulfate; alkali metal salts of lignosulfonic acids, alkali metal salts and free acids of complex organic phosphate esters such as the alkoxy- and alkylphenoxy-poly(ethyleneoxy)-esters of phosphoric acid mono- or diesters (sold as GAFAC emulsifiers by General Aniline and Film Corporation), silicic acids, and the like; and colloidal materials such as casein, sodium polyacrylate, carboxymethylcellulose, hydroxyethylcellulose, gum tragacanth, sodium alginate, gelatin, methylcellulose, gum arabic, dextrins and polyvinyl alcohol.

Preferably, emulsion polymerization techniques are employed so that the product of the polymerization reaction will be the desired stable aqueous polymer dispersion wherein at least a portion of the polymer molecules contain the desired grafts. Where other polymerization techniques are employed, it may be necessary to emulsify the graft polymer using conventional dispersion techniques. Thus, graft polymers prepared by suspension techniques can be emulsified in solution using conventional surface active agents to stabilize the aqueous emulsion. Graft polymers prepared in bulk can be ground in ball, pebble, colloidal mills and the like and then added to water with mechanical stirring or vibration, sonic vibrations, etc., to form an aqueous dispersion which is stabilized with surface active agents normally employed in polymeric latices to prevent, or reduce the amount of, solid settling, stratification or phase separation.

The stabilizers which may be incorporated into the aqueous dispersions of this invention are well known and require no detailed description herein as they are the conventional stabilizing agents normally employed in polymer latices. Thus, soaps such as the fatty acid soaps and disproportionated rosin soaps can be used as surface-active materials to stabilize the dispersions. Likewise, anionic, cationic, and non-ionic surface active agents may be employed. The anionic surface active agents may function as dispersing and wetting agents and include alkyl aryl sulfonates, sulfated or sulfonated fatty alcohols, sulfonated vegetable oils, acid ester sulfonates, and acid amide sulfonates. Like the soaps, these materials migrate to and orient themselves along the polymer interface thereby rendering the polymer dispersion or suspension more stable in water. The cationic surface agents are exemplified by the long-chain aliphatic amines, long-chain quaternary ammonium compounds, esters of triethanolamine, and the like. Non-ionic surface active agents include long-chain carboxylic acid esters of polyhydric alcohols, esters of long-chain alcohols with polyhydroxy acids, and alkyl phenol-ethylene oxide condensation products. Other examples of surface active agents suitable as emulsifiers or stabilizers in the aqueous dispersions of this invention are those listed hereinabove as suitable in emulsion polymerization procedures.

Other stabilizers include tetrapotassium pyrophosphate, trisodium phosphate, ethanolamines, sodium hydroxide, potassium hydroxide, monomethylamine, dimethylamine, morpholine, and ammonium hydroxide. Similarly, protective colloids may be incorporated into the aqueous dispersions to stabilize them. Such colloids include starch, glues, shellac, poly(vinyl alcohols), sodium polyacrylate, methylcellulose, ethylcellulose, and casein.

Other useful techniques for preparing the graft polymers involve the use of ultraviolet, x-ray or gamma irradiation to produce free radicals on the base polymer. These free radicals furnish polymerization sites from which propagation with the grafting monomer proceeds, thereby furnishing the desired graft.

These irradiation techniques can be employed in several ways. Thus, the base polymer can be irradiated in the absence of oxygen and other free radical acceptors, for example, in a vacuum, to produce "trapped" radicals along the backbone thereof. After the irradiation of the base polymer is completed, it is then contacted with the grafting monomer. Contact can be effected in the liquid, solid, or gaseous state. Obviously, free radical acceptors other than the grafting monomers should be excluded. This is a particularly efficient grafting method.

Another method for achieving grafting through the use of irradiation techniques is to subject a mixture of the base polymer and the grafting monomer, usually in the form of an aqueous emulsion, to irradiation. For example, grafting may be achieved by contacting a base polymer latex with the grafting monomer for a period of several hours to several days and thereafter subjecting the latex to x-ray or gamma irradiation.

As is known, the presence of methanol in the base polymer-grafting monomer mixture often increases grafting efficiency with x-ray and gamma irradiation. Likewise, the presence of photosensitizers such as benzil, benzoin, anisoin, dinitrobenzil, 1-chloroanthraquinone, xanthone, benzophenone, 2-chloroanthraquinone, and the like usually increases grafting efficiency with ultraviolet light.

When employing x-ray or gamma irradiation techniques, a dose rate of 20 to about 500,000 r/hr. can be employed. However, dose rates of about $0.1$-$6.0 \times 10^5$ r/hr. are usually employed. The total dose required obviously depends on the natures of the base polymer and grafting monomers used. Generally, however, the total dose will vary between about 5,000 and about 700,000 rad. Since grafting by irradiation techniques is old in the art, no further discussion is necessary here.

The substantially stable aqueous dispersions of this invention may contain a total of about 10–80 percent by weight of dispersed solids. Usually, the amount of dispersed solids will be about 20–70 percent of the aqueous dispersion. Solids which may be present in the aqueous dispersion in addition to the polymers include pigments, fillers, and the like.

The terminology "substantially stable" is intended to describe that state of stability wherein the dispersed solids are essentially homogeneously dispersed throughout the liquid phase of the aqueous dispersion for a period of time sufficient to permit the use of the dispersion in applying protective films or adhesive coatings. Thus, stability of the dispersion over a long period of time is not essential and substantial stability over a few hours is generally adequate.

The amount of grafting monomer utilized in the polymerization process to prepare the substantially stable aqueous dispersions and mixtures of this invention is such that the total weight of monomer employed in the graft polymerization reaction constitutes about 0.25-50.0 percent usually about 1-30 percent by weight based on the base polymer. Optimum amounts for various base polymers will vary but will usually fall within this latter range. In most instances, the optimum amount of grafting monomer to be employed will be about 1-15 percent by weight.

It is not necessary that grafts be formed on all the base polymer molecules. When the polymerization of the grafting monomer is conducted in the presence of the base polymer using the processes and amounts of monomer indicated above, sufficient grafting takes place to impart the desired increase in wet adhesion and blister resisting capabilities to the films produced from the resulting aqueous dispersions.

As is the case with most graft polymers, particularly commercially utilized graft polymers, it is unnecessary to separate the graft polymer from any ungrafted base polymer or any homopolymers and copolymers of the grafting monomers formed during the graft polymerization process. In fact, the isolation of pure graft polymers is generally a matter of academic interest since their isolation is a tedious, timeconsuming, and thus expensive procedure. Accordingly, the grafted polymers of this invention normally will be employed without any attempt to isolate them. That is, they will be employed as a heterogeneous admixture of the desired graft polymer and any ungrafted synthetic base polymer or homopolymerized or copolymerized polymer produced from the polymerization of the grafting monomer which may be present in the reaction mixture.

Where it is desired to isolate the graft polymer, the principal techniques employed are fractional precipitation from a common solvent, fractional elution with successive mixtures of solvent and nonsolvent, selective precipitation from a solution of the products produced by the graft polymerization techniques, and selective elution, and combinations of these methods. These general methods for the isolation of graft polymers are known to those skilled in the art.

The present invention is illustrated by the following examples. As indicated hereinabove, all parts and percentages refer to parts by weight and percent by weight unless otherwise indicated. The reactions are conducted in reaction vessels equipped with mechanical stirrers, reflux condensers, subsurface gas inlet lines, temperature measuring means, and means for adding additional materials to the reaction flask during the course of reaction.

EXAMPLE 16

A polyvinyl acetate homopolymer is prepared by adding 100 parts of vinyl acetate to a mixture of 800 parts water, 8 parts hydroxyethyl cellulose, 5 parts of an aqueous alcoholic solution of a sodium alkyl aryl polyether sulfonate surfactant containing about 28 percent of the sulfonate (available as Triton X200 from Rohm & Haas Chemical Co.), 47 parts of an aqueous alcoholic solution of an ethyloxylated octylphenol containing an average of about 40 ethylene oxide units per molecule, and 1.5 parts sodium acetate. The resulting mixture is blown with nitrogen from a subsurface gas inlet line for about 0.5 hour at room temperature. Then 0.4 part of ammonium peroxydisulfate and 0.4 part of a sodium sulfoxylate formaldehyde dihydrate (NaHSO$_3$.CH$_2$O.2H$_2$O) available as Formopon from Rohm & Haas Chemical Co., are added and this mixture is heated to about 65°C. over 0.25 hour. To this heated mixture there is simultaneously added three separate preformed mixtures over 1.25 hour while maintaining a temperature of 70°-80°C. The first mixture consists of 1400 parts of vinyl acetate monomer, 560 parts of water, 7 parts of hydroxyethyl cellulose, 10 parts of the same aqueous alcoholic solution of the sodium alkyl aryl polyether sulfonate, 28 parts of the same aqueous alcoholic solution of ethyloxylated octylphenol, 2.8 parts of sodium acetate, and 3 parts of tert-butyl hydroperoxide. The second mixture consists of 2.8 parts of ammonium peroxydisulfate and 50 parts distilled water. The third mixture consists of 2.8 parts of Formopon and 50 parts of distilled water. Upon completion of the addition, the mixture is maintained at about 75°C. for an additional 0.5 hour, cooled to room temperature, and filtered through cheesecloth. The filtrate is the desired polyvinyl acetate latex characterized by a dispersed solids content of about 50 percent.

A mixture comprising 200 parts of the above latex and one part of tert-butyl hydroperoxide is heated from room temperature to about 70°C. over 0.5 hour. Thereafter a preformed mixture of 10 parts of an aqueous solution of the product of Example 5, 5 parts of water and 0.8 part of Formopon is added over 0.5 hour while maintaining the temperature of about 70°-75°C. Upon complete addition of the preformed mixture, the reaction mass is held at 65°-70°C. for an additional hour, cooled to room temperature, and filtered through cheesecloth. The filtrate is a fluid white latex.

EXAMPLE 17

To a mixture of 200 parts of the polyvinyl acetate latex of Example 16, 2.6 part of diacetone acrylamide and 36 parts water, there is added one part of tert-butyl hydroperoxide. The resulting mixture is heated to 50°C. over 0.25 hour at which time a mixture of 0.8 part Formopon and 20 parts of water is added over 0.25 hour. The mixture is then maintained at a temperature of about 65°-70°C. for one hour, cooled to room temperature and filtered through cheesecloth. The filtrate is a thixotropic latex.

EXAMPLE 18

To a mixture comprising 270 parts of a commercial polyvinyl acetate latex containing 50 percent solids (Vinac 880 available from Airco Chemicals and Plastics and suitable for use as a paper coating), 15 parts diacetone acrylamide and 38 parts water, there is added about 3 parts tert-butyl hydroperoxide and the resulting mixture is heated to about 50°C. over 0.25 hour. Then a mixture of one part Formopon in 19 parts water is added over one hour while heating to 70°C. This mixture is maintained at about 70°C. for an additional 0.5 hour and cooled to room temperature. The product is a gel-like material which fluidizes at room temperature under shear.

EXAMPLES 19–22

Following this general procedure of Example 18, the following materials are reacted in the amounts (parts) indicated.

| Ex. | Vinac 880 | Diacetone Acrylamide | Water | Tert-Butyl Hydroperoxide | Formopon | Water |
|---|---|---|---|---|---|---|
| 19 | 285 | 7.5 | 45 | 1.5 | 0.5 | 9.5 |
| 20 | 270 | 15.0 | 38 | 3 | 1.0 | 174* |
| 21 | 285 | 7.5 | 45 | 1.5 | 0.5 | 160.5** |
| 22 | 100 | 1.3 | 67 | 1 | 0.4 | 3 |

*Nineteen parts added with Formopon; 154 parts added subsequently.
**Nine and one-half parts added with Formopon; 151 parts added subsequently.

The products of Examples 19 and 20 are gel-like thixotropic latices which fluidize readily under shear at room temperature; the product of Example 21 is a very fluid latex; and the product of Example 22 is a viscous, thixotropic latex.

EXAMPLE 23

A mixture comprising 330 parts of a commercial polyvinyl acetate latex containing about 55–57 percent dispersed solids (available as Vinac XX210 from Airco Chemicals and Plastics and suitable for use as a latex adhesive), 20 parts diacetone acrylamide, and 130 parts water is heated to about 55°C. over a 0.25 hour period. Then 3 parts of tert-butyl hydroperoxide are added followed by the addition of a mixture of one part Formopon and 19.0 parts water over a 0.25 hour period while maintaining the temperature at about 70°C. After heating for an additional hour at about 70°C., the reaction mixture is cooled to room temperature and filtered through cheesecloth. The filtrate is a white latex.

EXAMPLE 24

One hundred parts of the commercial polyvinyl acetate latex of Example 18 and one part of tert-butyl hydroperoxide are mixed and heated to 70°C. over 0.25 hour. Then a mixture containing 5.8 parts of the product of Example 5, 72 parts water, and 0.4 parts Formopon are added over two hours while maintaining a temperature of about 75°–85°C. Upon completion of the addition of this mixture, heating is maintained at about 80°C. for an additional two hours. Upon cooling, the product is a white fluid latex.

EXAMPLE 25

A mixture comprising 80 parts of vinyl acetate monomer, 20 parts butyl acrylate monomer, 800 parts water, 8 parts of hydroxyethyl cellulose, 5 parts of an aqueous alcoholic solution of a sodium alkyl aryl polyether sulfate containing about 20 percent of the sodium sulfate (commercially available as Triton X301 from Rohm & Haas Chemical Company), 47 parts of the aqueous, alcoholic solution of ethoxylated octylphenol of Example 16, and 1.5 parts sodium acetate, are mixed for about 0.5 hour at room temperature while blowing nitrogen through the mixture via a subsurface gas inlet line. Subsequently, 0.4 part of ammonium peroxydisulfate are added, the mixture heated to about 70°–80°C., after which a preformed mixture of 1120 parts vinyl acetate, 280 parts of butyl acrylate, 560 parts water, 7 parts hydroxyethyl cellulose, 10 parts of the aqueous alcoholic solution of sodium sulfate, 28 parts of the solution of ethoxylated octylphenol, 2.8 parts sodium acetate, and 3 parts tert-butyl hydroperoxide are added over a 1.25 hour period. While this mixture is being added, two other mixtures, one comprising 2.8 parts of ammonium peroxydisulfate and 50 parts water and the other comprising 2.8 parts Formopon and 50 parts water are added simultaneously over the same period of time. Upon completion of the addition of these mixtures, the reaction mixture is maintained at about 70°C. for 0.5 hour, cooled to room temperature, and filtered through cheesecloth. The filtrate is a vinyl acetate-butyl acrylate copolymer latex containing about 50 percent dispersed solids.

To a mixture comprising 100 parts of this latex, 2.7 parts diacetone acrylamide, and 67 parts water, there is added one part tert-butyl hydroperoxide and the mixture is heated from room temperature to about 55°C. over 0.25 hour. Thereupon, a mixture comprising 0.4 part Formopon and 7.0 parts of distilled water is added to the mixture during 0.25 hour while maintaining a temperature of about 70°C. Heating is continued for an additional hour at 70°C. and then the reaction mixture is cooled to room temperature. The cooled product is a gel-like thixotropic latex which fluidizes at room temperature when subjected to shear.

EXAMPLE 26

To 100 parts of the vinyl acetate-butyl acrylate copolymer latex of Example 25, containing about one part of tert-butyl hydroperoxide, which has been heated to about 70°C., there is simultaneously added over a 0.5 hour period two mixtures, one being a mixture of 5.2 parts of the product of Example 5 and 67 parts water, the second mixture consisting of 0.4 part Formopon and 5 parts water. Upon completion of the addition of these two mixtures, the reaction mixture is held at about 70°C. for 1 hour, cooled to room temperature, and filtered through cheesecloth. The product is a fluid white latex.

EXAMPLE 27

To 200 parts of the vinyl acetate-butyl acrylate copolymer latex of Example 25, containing about one part tert-butyl hydroperoxide, previously heated to 70°C., there is added over 0.5 hour a mixture comprising 10 parts of the product of Example 5, 5 parts water, and 0.8 parts Formopon during which time the reaction mixture is maintained at 70°–75°C. The temperature is held at about 70°–75°C. for an additional hour, the reaction mixture is then cooled to room temperature and filtered through cheesecloth. The filtrate is a fluid white latex.

EXAMPLE 28

A mixture comprising 75 parts of vinyl acetate, 25 parts dibutyl maleate, 800 parts water, 8 parts hydroxyethyl cellulose, 5 parts of the aqueous alcoholic solution of sodium sulfate described in Example 25, 47 parts of the aqueous alcoholic solution of ethoxylated octylphenol as described in Example 16, and 1.5 parts of sodium acetate is blown via a subsurface gas inlet tube with nitrogen for 0.5 hour at room temperature. Then, 0.4 part of ammonium peroxydisulfate and 0.4 part of Formopon are added and the mixture is heated to about 65°C. over 2.5 hours. Subsequently, three additional preformed mixtures are heated simultaneously over 1 hour: the first mixture comprising 1050 parts vinyl acetate, 350 parts dibutyl maleate, 560 parts water, 7 parts hydroxyethyl cellulose, 10 parts of the aqueous alcoholic solution of sodium sulfate, 28 parts of the aqueous alcoholic solution of ethoxylated octylphenol, 2.8 parts of sodium acetate, and about 3 parts tertbutyl hydroperoxide; the second mixture consisting of 2.8 parts of ammonium peroxydisulfate and 50 parts water; and the third mixture consisting of 2.8 parts Formopon and 50 parts water. After completion of the addition of these mixtures, the reaction mixture is maintained at about 75°-80°C. for an additional hour, cooled to room temperature, and filtered through cheesecloth. The filtrate is a vinyl acetate-dibutyl maleate copolymer latex containing about 50 percent dispersed solids.

To 200 parts of the above latex containing about one part tert-butyl hydroperoxide which has been heated to about 70°C., there is added over 0.5 hour a mixture comprising 10 parts of the product of Example 5, 5 parts water, and 0.8 parts Formopon over one hour while maintaining a temperature of 70°-75°C. Upon completion of the addition of this mixture, the temperature is maintained within the range of 65°-70°C. for an additional hour, cooled to room temperature, and filtered through cheesecloth. The filtrate is a fluid white latex.

EXAMPLE 29

A vinyl acetate-higher molecular weight vinyl ester copolymer latex is prepared according to the procedure outlined hereinbelow. The higher molecular weight vinyl ester is the vinyl ester of a commercially available mixture of highly branched alkanoic acids containing 9-11 carbon atoms. The alkyl groups of the acids are primarily tert-alkyl groups.

To a mixture comprising 37.5 parts vinyl acetate, 12.5 parts of the vinyl carboxylates described above, 350 parts water, 20 parts of an aqueous alcoholic solution of ethoxylated octyl phenol described in Example 16, 9 parts of an aqueous alcoholic solution of the sodium alkyl aryl polyether sulfonate described in Example 16, 1.9 parts hydroxyethyl cellulose, and 0.7 parts sodium acetate, there is added 0.2 part of ammonium peroxydisulfate in 5 parts water and 0.2 parts of Formopon in 5 parts water. This mixture is then heated to about 65°C. over 0.25 hour and thereafter three mixtures are simultaneously added while maintaining a temperature of 65°-80°C. The first mixture consists of 525 parts of vinyl acetate, 175 parts of the vinyl carboxylates described above, 340 parts distilled water, 10 parts of the aqueous alcoholic solution of ethoxylated octylphenol, 45 parts of the aqueous alcoholic solution of the sodium alkyl aryl polyether sulfonate, 1.9 parts of hydroxyethyl cellulose, and about 1.5 parts of tert-butyl hydroperoxide. The second mixture consists of 1.4 parts of ammonium peroxydisulfate in 25 parts water while the third mixture consists of 1.4 parts of Formopon in 25 parts water. As with the polymer latices prepared as described hereinabove, the mixture of monomers which is added to the reaction flask is pre-emulsified with the other components of the mixture by thorough mixing prior to adding it to the reaction mixture. Upon completion of the addition of these three mixtures, the reaction mixture is maintained at about 75°C. for an additional 0.5 hour, cooled to room temperature and filtered through cheesecloth. The product is the desired copolymer latex containing about 50 percent dispersed solids.

A mixture comprising 100 parts of the above latex, 2.7 parts of diacetone acrylamide, 67 parts water, and one part tert-butyl hydroperoxide is heated to about 55°C. at which time a mixture of 0.4 part Formopon and 7 parts water is added over 0.25 hour. Upon completion of this addition, the temperature of the reaction mixture is maintained at about 70°C. and cooled to room temperature. The product is a thixotropic latex.

EXAMPLE 30

The procedure of Example 29 is repeated using 5.7 parts of diacetone acrylamide and a mixture comprising 0.4 part of Formopon and 13 parts water. Again, a thixotropic latex is produced.

EXAMPLE 31

A mixture comprising 100 parts of a vinyl acetateethylene copolymer latex containing 55 percent dispersed solids (commercially available as Aircoflex 100HS from Airco Chemicals and Plastics), 3 parts diacetone acrylamide, 83 parts water, and about one part tert-butyl hydroperoxide is heated to about 50°C. over 0.25 hour and subsequently a mixture of 0.4 part Formopon and 7 parts water are added over 0.5 hour while maintaining a temperature of 50°-70°C. Upon completion of the addition, the reaction mixture is maintained at about 70°C. for an additional hour and allowed to cool to room temperature. The product is a thixotropic latex.

EXAMPLE 32

One hundred parts of the vinyl acetate-ethylene copolymer latex of Example 31 containing about one part tert-butyl hydroperoxide is heated to 70°C. While maintaining the temperature at about 70°-85°C., a mixture of 5.8 parts of the product of Example 5, 83 parts water, and 0.4 part Formopon are added over about 1 hour. The temperature is thereafter maintained at about 80°C. for 2 hours at which time the reaction mixture is cooled to room temperature and filtered through cheesecloth. The filtrate is a white, fluid latex.

EXAMPLE 33

A methyl methacrylate-ethyl acrylate copolymer latex is prepared as follows: A mixture of 214 parts methyl methacrylate, 320 parts ethyl acrylate, 1000 parts water, and 11 parts 75 percent aqueous solution of the dioctyl ester of sodium sulfosuccinic acid (surface active agent) is mixed and blown with nitrogen for about 0.5 hour via a subsurface gas inlet tube. Then, 0.5 part of ammonium peroxydisulfate is added and the mixture heated to about 55°C. at which time the resulting exothermic reaction raises the temperature to about 80°C. The temperature is thereafter maintained at 80°-90°C. for 1 hour and cooled to room temperature. Then, 27 parts of the aqueous alcoholic solution of ethoxylated octylphenol described in Example 16 and 425 parts of water are added. A pre-emulsified mixture of 326 parts methyl methacrylate, 490 parts ethyl acrylate, 600 parts water, and 16 parts of the 75 percent aqueous solution of the dioctyl ester of sodium sulfosuccinic acid is added to the reaction mixture followed by 0.8 part of ammonium peroxydisulfate. The temperature is then raised to about 60°C. over 0.25 hour at which time an exothermic reaction increases the temperature to about 80°C. over 0.75 hour. The reaction mixture is maintained at 80°-90°C. for an additional hour at which time 0.2 part of ammonium peroxydisulfate is added along with 0.2 part Formopon. The temperature of the reaction mixture is maintained at about 70°C. for 0.5 hour. It is then cooled to room temperature, and filtered through cheesecloth. The filtrate is a fluid white latex containing about 40 percent dispersed solids.

To 237.5 parts of the above latex containing about one part of the tert-butyl hydroperoxide previously heated to 70°C. there is added a mixture consisting of 9.6 parts of the product of Example 5, 6 parts water, and 0.8 part Formopon. This addition is carried out over 0.5 hour while maintaining the temperature at 70°–75°C. Upon completion of the addition, the temperature is held at 75°C. for about 1 hour. The mixture is then cooled to room temperature, and filtered through cheesecloth.

EXAMPLE 34

The procedure of Example 33 is followed using 120 parts of the methyl methacrylate-ethyl acrylate latex, 4.8 parts of the product of Example 5, 67 parts water, 0.4 part Formopon, and about one part tert-butyl hydroperoxide. The filtrate is a fluid white latex containing about 30 percent dispersed solids.

EXAMPLE 35

To a mixture comprising 120 parts of the methyl methacrylate-ethyl acrylate latex of Example 33, 2.5 parts diacetone acrylamide, and 60 parts water, there is added about one part tert-butyl hydroperoxide and the resulting mixture is then heated to about 55°C. over 0.25 hour. At that point, a mixture of 0.4 part Formopon and 7 parts water are added while maintaining a temperature of 55°-65°C. over 0.25 hour. Upon completion of this addition, the reaction mixture is maintained at 65°-70°C. for an additional hour, cooled to room temperature, and filtered through cheesecloth. The filtrate is a fluid white latex.

EXAMPLE 36

A mixture comprising 1800 parts distilled water, 24 parts of potassium oleate, 15 parts potassium soap of rosin acid, 15 parts of the sodium salt of a naphthalene sulfonic acid formaldehyde condensation product (commercially available as Tamol N from Rohm & Haas Co.) and one part of potassium hydroxide is cooled to 5°C. Thereafter, 2 parts of potassium peroxydisulfate are added and the mixture is blown with nitrogen via a subsurface gas inlet line for 0.5 hour at room temperature. Subsequently, 800 parts of butadiene and 200 parts of styrene are added followed by 3 parts of tert-dodecylmercaptan, one part of cumene hydroperoxide, and 10 parts of an aqueous solution of Formopon (20 percent water). The temperature is raised to about 50°C. over 0.25 hour and maintained at that point for an additional sixteen hours. At that point, a mixture comprising 2 parts of the sodium salt of N,N-diethyldithiocarbamate, 78 parts water, and 20 parts of an aqueous alcoholic solution of ethoxylated octylphenol as described in Example 16 are added. The reaction mixture is then cooled to room temperature and filtered through cheesecloth. The filtrate is a butadiene-styrene copolymer latex containing about 36 percent dispersed solids.

To a mixture comprising 834 parts of the above latex, 9 parts of the aqueous alcoholic solution of ethoxylated octylphenol, and 2 parts of t-butyl hydroperoxide, there is added 30 parts of diacetone acrylamide and the resulting mixture is heated to about 60°C. over 0.25 hour period. Thereafter, 60 parts of an aqueous solution containing 5 percent Formopon is added over 0.5 hour while maintaining the temperature at 60°-70°C. The mixture is maintained at about 65°C. for an additional 0.5 hour and cooled to room temperature. After cooling, a mixture of 0.4 part of the sodium salt of N,N-diethyldithiocarbamate, one part water, and one part of the aqueous alcoholic solution of ethoxylated octylphenol described hereinbefore are added. After stirring, this mixture is then filtered through cheesecloth. The filtrate is a fluid white latex which is suitable for use as an adhesive, for example as a tire cord adhesive.

Following the procedures of Examples 16–36, other aqueous dispersions of this invention can be prepared by substituting other latices and other grafting monomers as described hereinabove for those used in these examples.

Where the viscous or gel-like aqueous dispersions of this invention are not suitable for a given application, they may be incorporated into additional fluid latices to render them more fluid. For example, the products of Examples 18–21 can be diluted by homogeneously dispersing them into additional Vinac 880 or other polyvinyl acetate latex until suitable fluidity is achieved as the aqueous dispersions of this invention are able to improve wet adhesion and/or blister resistance even at very low concentrations. Thus, when a polyvinyl acetate latex prepared as described in Example 16 is added to a gel-like aqueous dispersion of this invention prepared by polymerizing 10 parts of diacetone acrylamide in the presence of 180 parts of that latex according to the general procedure of Example 17, a latex is produced which is fluid at room temperature. The weight ratio of polyvinyl acetate latex to gel-like aqueous dispersion can be, for example, 100:112, 150:56, or some other ratio that will produce the desired fluidity.

The gel-like and viscous thixotropic aqueous dispersions of this invention can be used as thixotropic additives for other latices. Because control of the rheological properties of latices is an important factor in adapting or developing them for given uses, the thixotropic gel-like and viscous aqueous dispersions of this invention will permit those skilled in the art to impart varying degrees of thixotropy to various latices.

Likewise, as shown by Example 18, the use of diacetone acrylamide as the grafting monomer often permits thixotropic properties to be imparted directly to a latex formation.

If thixotropic characteristics found to be imparted to a given latex formulation by the use of a particular grafting monomer are undesirable or unnecessary for a given application, then selection of another grafting monomer or a combination of two or more grafting monomers may be necessary. For example, in those latices where diacetone acrylamide results in aqueous dispersions which, for a given use, are too thick or viscous, then the product of (for instance) Example 5, alone or in combination with diacetone acrylamide, can be used to produce aqueous dispersions of lesser viscosity. The use of the product of Example 5 does not appear to significantly alter the thixotropic characteristics of the latex.

The commercial polyvinyl acetate latex employed in Example 23 contains dispersed polymer molecules having an average particle size of about 2.5 microns. The size of the latex particles in the commercial polyvinyl acetate latex of Example 18 is significantly smaller, on the average of about 0.15–0.3 micron. It has been found that when the average particle size of the molecules in a latex is about one micron or larger, the polymerization of diacetone acrylamide in the presence of these molecules according to this invention does not significantly alter the thixotropic properties of the latex. On the other hand, when the average particle size is less than about one micron, especially less than 0.75 micron, the use of diacetone acrylamide in preparing the graft polymer dispersion of this invention does impart thixotropic properties to the latex.

The aqueous dispersions of this invention may contain other additives normally found in paints, adhesives, and the like. These other conventional additives include antifoaming agents, defoaming agents, preservatives, thickeners, softeners, stiffeners, tackifiers, antioxidants, deodorants, pigments, and fillers. When these other additives are water-soluble, they can be dissolved in the aqueous dispersions. Water insoluble liquids and solids are incorporated into the aqueous dispersions by convention emulsification techniques as described hereinbefore. Examples of these materials are presented below. The stabilizer discussed in detail hereinabove may be incorporated into the aqueous dispersions to keep the water-insoluble additives substantially stably dispersed in the aqueous dispersions.

The preservatives are generally fungicides and bactericides such as ammonia, formaldehyde, sodium pentachlorophenoxide, sodium o-phenylphenoxide, paradichloro-m-cresol and phenylmercuric acetate. Examples of antifoaming agents include fatty acids, pine oils, vegetable oils, casein wax, heavy metal stearates, cetyl alcohol, lauryl alcohol and dimethylpolysiloxane oil emulsions containing various silicates. Antioxidants include alkylated and styrenated phenols, phosphites, and alkylated diphenols as well as secondary amines such as phenyl-beta-naphthalamine and acetone-aniline condensation products. Thickening agents include casein, starch, locust bean gum, bentonite clay, sodium silicate, karaya gum, methyl cellulose, sodium carboxymethylcellulose, sodium polyacrylates, alginates, and the like. Typical tackifiers which may be used to improve adhesion include hydrogenated rosin, ester gum, coumarone resins and low-molecular weight polybutenes. Softeners or plasticizers include hydrocarbon oils, dioctyl phthalate and dibutyl sebacate. Stiffeners are represented by coumarone resins with high melting points, rosin esters, and thermal setting resins such as the urea-formaldehyde condensation resins and the phenol-formaldehyde condensation resins. Typical pigments include iron oxides, chrome oxides, titanium dioxide, and ultramarine blue. Perfumes, pine oil, camphor and oil of wintergreen are examples of deodorants which may be added to mask odors of the aqueous dispersions of the film-forming macromolecules as well as any odors in the protective film or adhesive coating produced from these aqueous dispersions. Typical fillers are titanium dioxide, mica, talc, clays, whitings, barytes, and the like.

When preparing aqueous dispersions containing one or more of these additional additives, the graft polymer dispersion is generally prepared first and the other materials are then added to this preformed dispersion. However, this is not critical and the graft polymer molecules as well as other insoluble additives may be incorporated into the aqueous dispersion simultaneously by conventional emulsification techniques. Thus, these emulsifiable materials can be emulsified through high-speed stirring devices, colloidal mills, homogenizers, and ultrasonic vibration. Likewise, water-insoluble materials may be incorporated into the aqueous dispersions of this invention by first dissolving them in a solvent for the particular material and thereafter emulsifying the solution.

As stated hereinabove, the aqueous dispersions of this invention will be employed primarily as latex paints and latex adhesives. The formulations required for using the aqueous dispersions of this invention as paints and adhesives include the conventional formulations currently employed for the polymers used as base polymers in this invention. For example, an aqueous dispersion of grafted polyvinyl acetate homopolymer or copolymer of this invention can be used, and ordinarily will be used, in formulations which are the same as corresponding polyvinyl acetate latex paint and adhesive formulations currently in use.

A typical paint formulation comprises the graft polymer dispersion, one or more surface active agents to function as a stabilizer or dispersant for the suspended solids and as wetting agents, antifoaming agents, pigment, preservative, and a coalescing agent. Suitable pigments for paint formulation include both inorganic and organic pigments such as titanium dioxide, iron oxide, chromium yellow, lithopone, toluidine red, hansa yellow, and phthalocyanine blues and greens. Typical extender pigments for paint formulation include clay, calcium carbonate, silica, diatomaceous silica, mica, and barytes. Corrosion inhibiting pigments such as red lead and zinc chromate may also be used. The pigments are kept in substantially stable suspension within the aqueous dispersions by anionic and non-anionic stabilizers of the type discussed hereinbefore which function as dispersants for the pigments.

Typical coalescing agents include Carbitol, butyl Carbitol acetate, ether alcohols, and the like, while conventional thickeners would include carboxymethylcellulose, methylcellulose, starch, casein and the like. The antifoam agents and defoamers employed in latex paints are generally non-silicone materials such as the higher alcohols, e.g., lauryl alcohol, octyl alcohol, and the like.

Typical paint formulations contain 100 parts of the aqueous dispersion (e.g., the filtrate of Example 16 or 26) excluding the weight of water present, 7 parts diethylene glycol monoethyl ether, 0.5 parts ammonium hydroxide, 0.35 parts of carboxymethylcellulose, and 140 parts of a pigment slip. A representative pigment slip would include 1.4 parts of a sodium alkyl aryl sulfonate stabilizer, 0.5 parts octyl alcohol, 13.5 parts red iron oxide, 69.6 parts talc, and 55 parts barytes.

Paint formulations produced in this manner can be applied to metals, wood, concrete, plaster, plastics, paper, and the like in the ordinary manner such as by spraying, brushing, rolling, dipping, etc. Upon drying, a protective coating is deposited on the surface to which the aqueous dispersion has been applied. The protective coating deposited in this manner may be deposited on top of, under, or in addition to other compatible protective and decorative coatings.

Likewise, the aqueous dispersions of this invention which are to be used as adhesives can be formulated in the same manner as conventional polymeric latex adhesives. Thus, a representative adhesive formulation for wood, paper, and the like would contain 100 parts of an aqueous dispersion according to this invention (e.g., the filtrate of Example 23), exclusive of the weight of water present in the dispersion, 5 parts ammonium caseinate, 20 parts rosin ester resin, 80 parts phenol-formaldehyde resin, and one part styrenated phenol. Another typical adhesive formulation would contain 100 parts of the aqueous dispersions of this invention (e.g., the filtrate of Example 36), exclusive of the water contained therein, 1.0 part of ammonium caseinate, 1.5 parts of phenol-formaldehyde resin, one part of styrenated phenol, 1.5 parts sulfur, 4.0 parts zinc oxide, and one part of the zinc salt of N,N-dibutyldithiocarbamate.

An aqueous dispersion according to the present invention suitable for coating paper would comprise 100 parts of the film-forming macromolecules of this invention (e.g., the filtrate of Example 21) exclusive of the water contained therein, 3 parts of tetrapotassium pyrophosphate, 10 parts cornstarch, 1000 parts clay, and 10 parts styrenated phenol. Another typical paper coating composition would comprise 100 parts of a graft polymer dispersion (excluding water) of this invention, 66 parts titanium dioxide, 2 parts tetrapotassium pyrophosphate, 13.2 parts cornstarch, 600 parts clay, and 7 parts styrenated phenol.

The foregoing adhesive formulations will be used in the same manner as conventional polymeric latex adhesives. Thus, they will be applied to one or more of the surfaces to be joined together or surface to be coated in any convenient manner such as by rolling, brushing, dipping, spraying, and the like.

Other formulations for using the substantially stable dispersions of this invention will be readily apparent to those skilled in the art.

What is claimed is:

1. A composition which is fluid at room temperature and which comprises a substantially stable dispersion in water of
   a graft polymer wherein the base polymer is at least one vinyl acetate, alkyl acrylate or alkyl methacrylate homopolymer or interpolymer and the grafted units are derived from at least one polymerizable component selected from the group consisting of:
   A. Substituted acrylamides of the formula

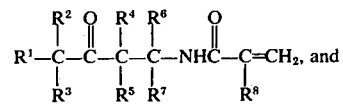

B. Water-soluble hydroxyalkylated compositions consisting essentially of
   X. compounds of the formula

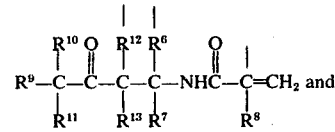

Y. condensation dimers and trimers of X; wherein
   each of $R^1$, $R^2$, $R^3$, $R^4$, $R^5$, $R^6$ and $R^7$ is hydrogen or a lower alkyl or substituted lower alkyl radical, at least one of $R^1$, $R^2$, $R^3$, $R^4$, and $R^5$ being hydrogen;
   $R^8$ is hydrogen, halogen or a lower alkyl or substituted lower alkyl radical;
   each of $R^9$, $R^{10}$, $R^{11}$, $R^{12}$ and $R^{13}$ is hydrogen, a lower alkyl or substituted lower alkyl radical, a hydroxyalkyl radical having not more than 4 carbon atoms, or an alkoxy derivative of said hydroxyalkyl radical, at least one being a hydroxyalkyl radical or alkoxy derivative thereof.

2. A composition according to claim 1 wherein dispersed solids comprise about 10–80 percent of the total weight of the composition.

3. A composition according to claim 2 wherein said grafted units are derived from at least one compound A.

4. A composition according to claim 3 wherein said grafted units are derived from diacetone acrylamide.

5. A composition according to claim 2 wherein said grafted units are derived from composition B.

6. A composition according to claim 5 wherein said composition B additionally contains compound A as a diluent, said diluent comprising no more than 50 percent of said composition B.

7. A composition according to claim 5 wherein from 1 to 3 of $R^9$, $R^{10}$, $R^{11}$, $R^{12}$ and $R^{13}$ are hydroxymethyl radicals, the remainder thereof being hydrogen; $R^6$ and $R^7$ are methyl radicals; and $R^8$ is hydrogen.

8. A composition according to claim 7 which additionally contains, as a diluent, up to 20% of diacetone acrylamide.

9. An emulsion paint comprising the composition of claim 1, an emulsifier, and pigment.

10. An emulsion comprising the composition of claim 4, an emulsifier, and pigment.

11. An emulsion paint comprising the composition of claim 8, an emulsifier, and pigment.

* * * * *

UNITED STATES PATENT OFFICE
CERTIFICATE OF CORRECTION

PATENT NO. : 3,896,073
DATED : July 22, 1975
INVENTOR(S) : Thomas Woods Smith

It is certified that error appears in the above-identified patent and that said Letters Patent are hereby corrected as shown below:

In column 1, the title should read --AQUEOUS DISPERSIONS OF FILM-FORMING POLYMERS--.

In column 24, in the formula at lines 11-15, $\overset{|}{R^{12}}$, $\overset{|}{R^6}$, and $-\overset{|}{\underset{|}{\underset{R^8}{C}}}=CH_2$ should read, respectively, $R^{12}$, $R^6$ and $-\underset{|}{\underset{R^8}{C}}=CH_2$.

Signed and Sealed this second Day of December 1975

[SEAL]

Attest:

RUTH C. MASON
*Attesting Officer*

C. MARSHALL DANN
*Commissioner of Patents and Trademarks*